Figure 1:
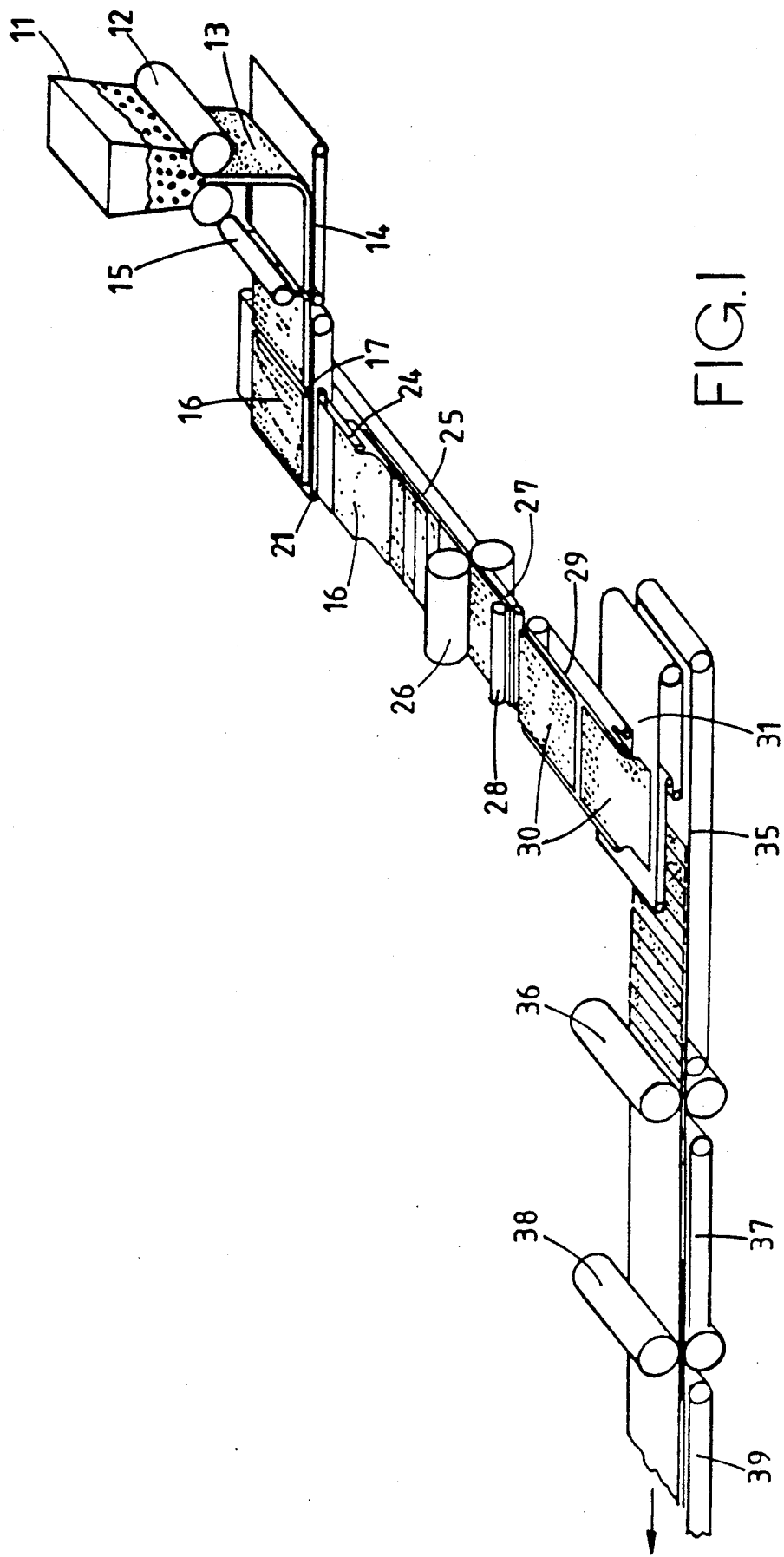

United States Patent [19]

Williams et al.

[11] Patent Number: 5,030,312
[45] Date of Patent: Jul. 9, 1991

[54] ELECTRO-CHEMICAL CELLS

[75] Inventors: Alan Williams; John E. Cook, both of Solihull, Great Britain

[73] Assignee: Lucas Industries PLC of Great King Street, United Kingdom

[21] Appl. No.: 443,919

[22] Filed: Nov. 30, 1989

[30] Foreign Application Priority Data

Dec. 7, 1988 [GB] United Kingdom ................ 8828519

[51] Int. Cl.$^5$ ............................................ B32B 31/18
[52] U.S. Cl. ..................................... 156/264; 156/243; 156/244.18; 156/266; 156/500; 156/512; 156/516; 156/517; 156/556
[58] Field of Search ............... 156/243, 244.11, 244.18, 156/264, 266, 512, 516, 517, 556, 500; 198/429, 581, 588, 594, 419.1, 419.2, 419.3

[56] References Cited

U.S. PATENT DOCUMENTS

| | | | |
|---|---|---|---|
| 2,761,803 | 9/1956 | Breitenbach | 156/512 |
| 4,087,308 | 5/1978 | Baugher et al. | 156/512 |
| 4,210,237 | 7/1980 | Gram | 198/419.2 |
| 4,221,627 | 9/1980 | Rost | 156/512 |
| 4,343,667 | 8/1982 | Hollis | 156/517 |
| 4,661,301 | 4/1987 | Okada et al. | 156/242 |
| 4,743,319 | 5/1988 | Ramcke | 156/517 |

Primary Examiner—Caleb Weston
Attorney, Agent, or Firm—Andrus, Sceales, Starke & Sawall

[57] ABSTRACT

A method of manufacturing elements of active material for use in the construction of electrodes for secondary electro-chemical cells characterized by comprising the steps of:

rolling active material mixture in a first direction to produce elongate strip, cutting the strip to define cut sheets of rolled material, transporting a cut sheet in said one direction on a movable end, first, conveyor, moving the movable end of said first conveyor to transfer said cut sheet to a stationary, second conveyor extending substantially perpendicular to said first conveyor, operating said second conveyor to transfer said cut sheet in a second direction substantially perpendicular to said first direction to a laminating station wherein the cut sheet is laminated with other cut sheets, and, rolling the laminated cut sheets in said second direction. An apparatus for use in the manufacture of active material elements is also disclosed.

7 Claims, 6 Drawing Sheets

ELECTRO-CHEMICAL CELLS

This invention relates to the manufacture of elements of active material for use in the construction of electrodes of secondary electro-chemical cells, for example nickel-cadmium (NiCad) cells. The invention is more specially concerned with methods and apparatus for the manufacture of such active material elements, and while, for convenience, the following disclosure relates to positive active material elements for NiCad cells, it should be recognised that the invention is not restricted to NiCad technology and may find application in relation to the manufacture of other types of secondary cell.

It is known, for example, from British patent number 1346890, to incorporate polytetrafluoroethylene (PTFE) in a dough-like mass including finally divided active material, the PTFE being intended to constitute a binder for the finely divided active material, and then to roll the dough-like mass to form sheets in which PTFE fibres, formed by the rolling process, interlock and support the active material. British patent number 1346890 discloses laminating the active material by folding and then again rolling the sheets of active material produced by the first rolling process. However, the procedure disclosed in British patent number 1346890 appears to be a manual procedure, there being no mechanism disclosed for handling the rolled sheets, and moreover, the procedural steps involved appear unsuited to mechanisation in a simple and convenient form, as a result, in part, of the fragility of the rolled sheets.

It is an object of the present invention to provide a method and apparatus for use in the manufacture of active material elements wherein the aforementioned disadvantages are minimised.

In accordance with a first aspect of the present invention there is provided a method of manufacturing elements of active material for use in the construction of electrodes for secondary electro-chemical cells comprising the steps of:
rolling active material mixture in a first direction to produce elongate strip,
cutting the strip to define cut sheets of rolled material,
transporting a cut sheet in said one direction on a movable end, first, conveyor,
moving the movable end of said first conveyor to transfer said cut sheet to a stationary, second conveyor extending substantially perpendicular to said first conveyor,
operating said second conveyor to transfer said cut sheet in a second direction substantially perpendicular to said first direction to a laminating station wherein the cut sheet is laminated with other cut sheets, and,
rolling the laminated cut sheets in said second direction.

In accordance with a second aspect of the present invention there is provided apparatus for use in the manufacture of elements of active material for use in the construction of electrodes for secondary electro-chemical cells, the apparatus comprising:
first roll means for rolling active material mixture in a first direction to produce elongate strip,
a cutter for cutting said strip to define cut sheets of rolled material,
a movable end, first, conveyor for transferring cut sheets away from said cutter in said one direction,
a second conveyor extending substantially perpendicular to said first conveyor,
means for moving the movable end of said first conveyor so as to transfer a cut sheet from the first conveyor to said second conveyor,
control means rendering said second conveyor stationary during transfer thereto of a cut sheet, laminating means receiving cut sheets from said second conveyor and,
second roll means for rolling laminated cut sheets in a second direction substantially perpendicular to said first direction.

Figure 6:
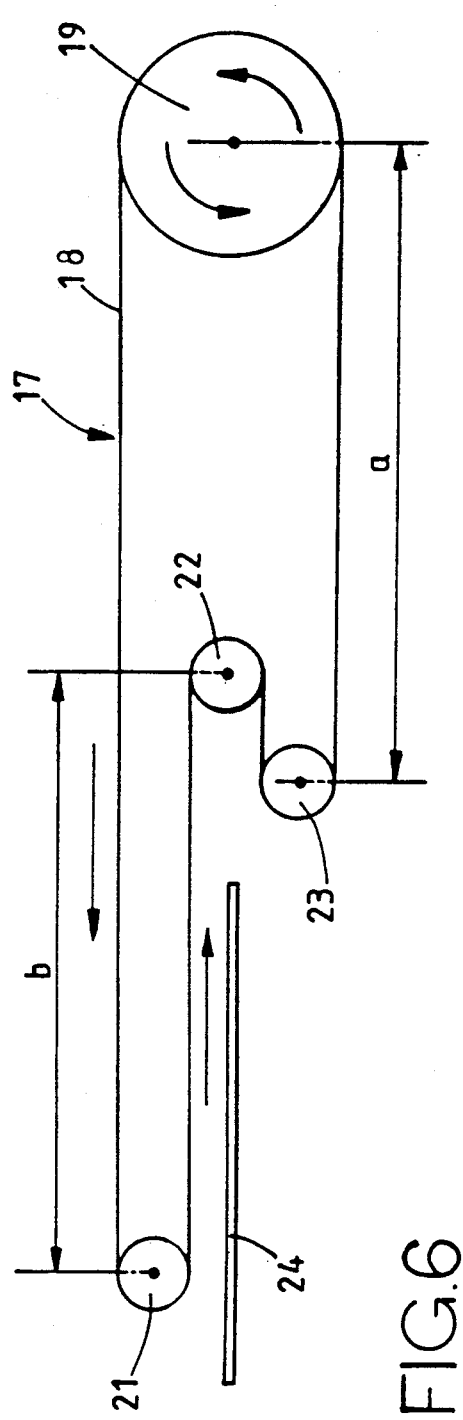
Figure 7:
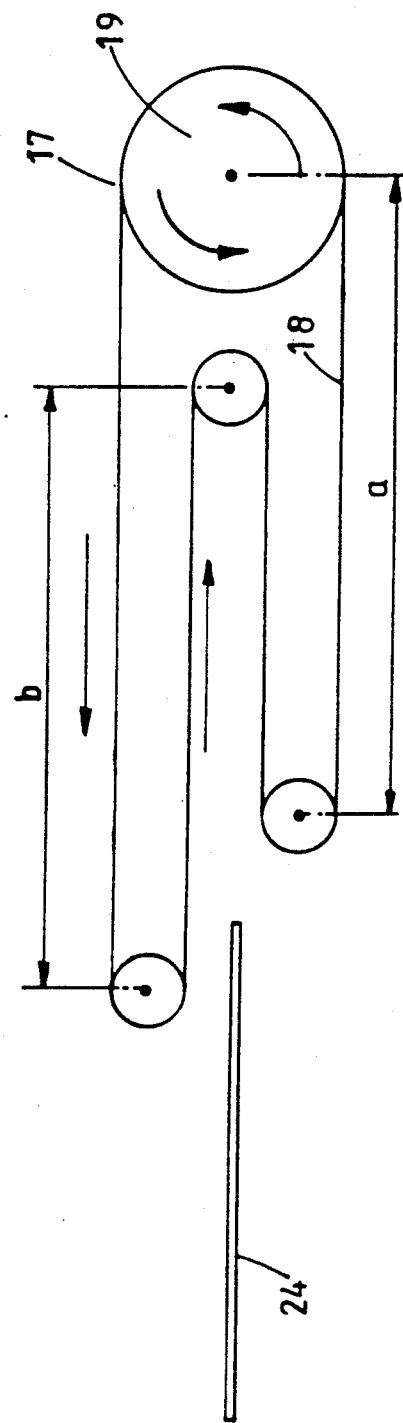
Figure 9:
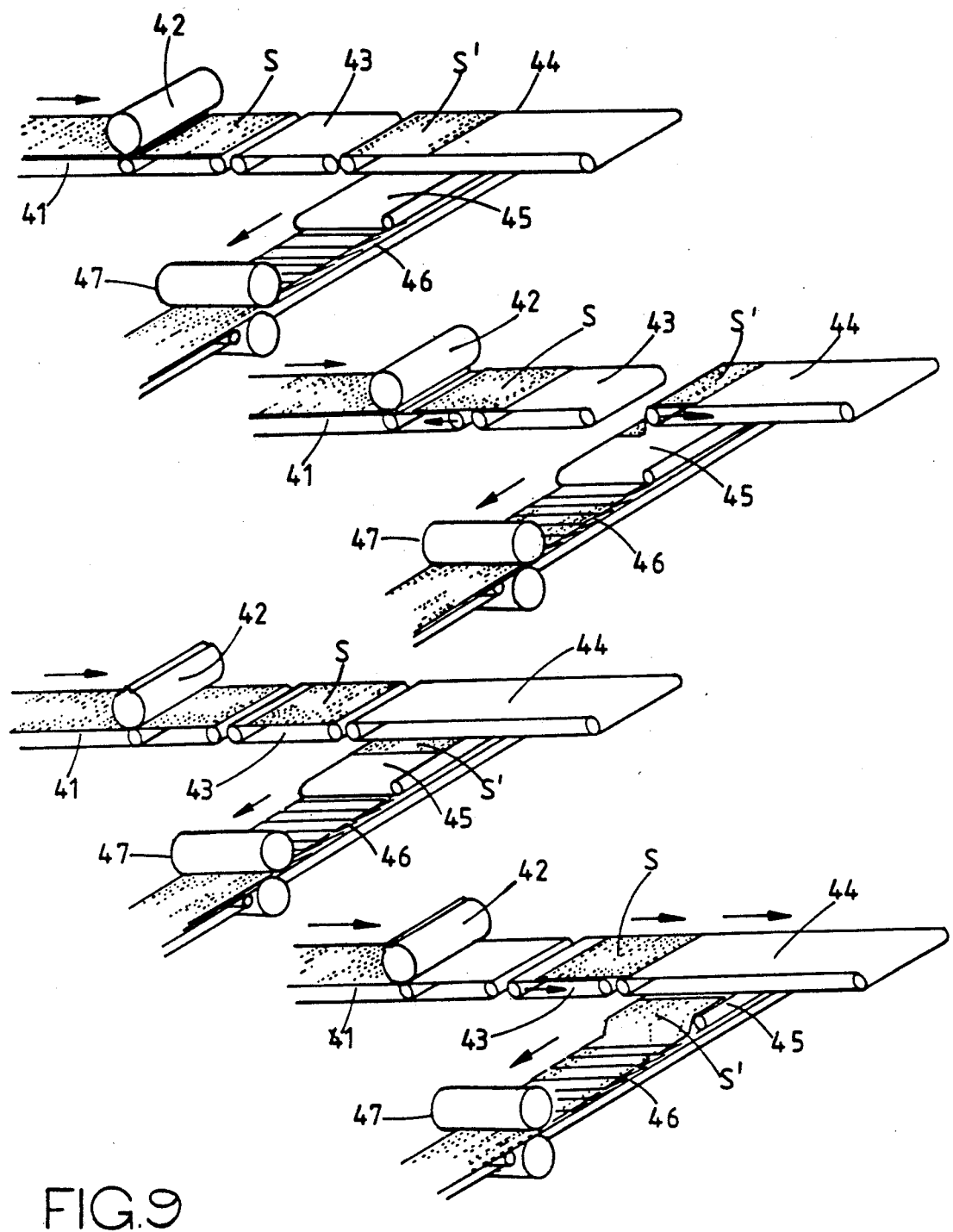
Figure 10:
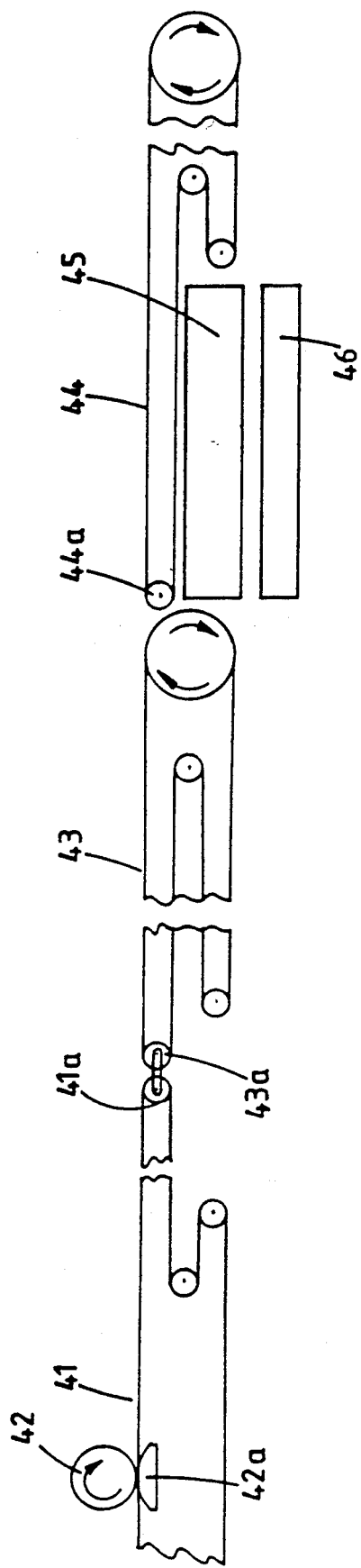
Figure 11:
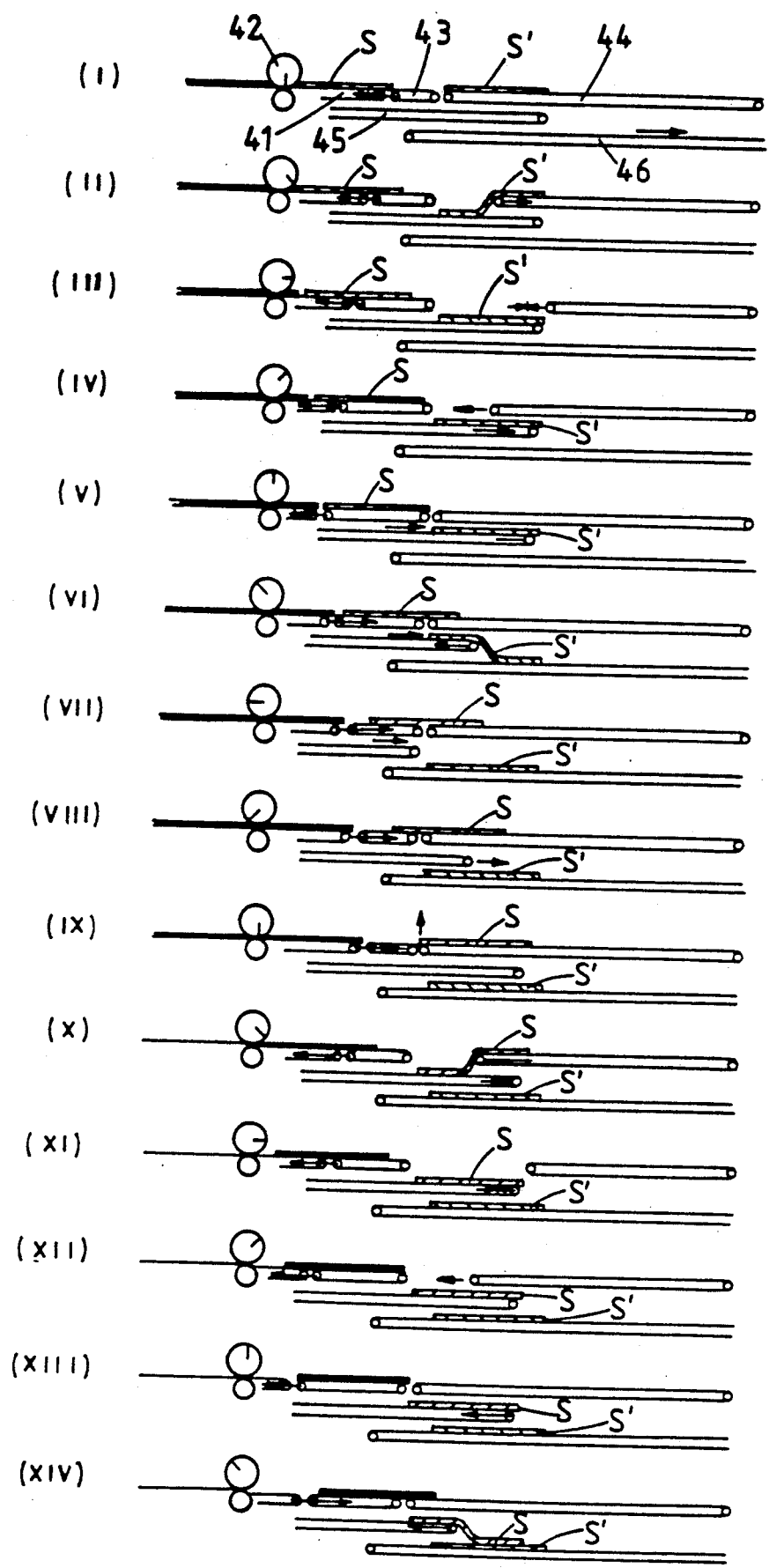

In the accompanying drawings;

FIG. 1 is a diagrammatic representation of one example of the present invention, and illustrates the process and apparatus for producing active material elements for use in the electrodes of secondary cells, FIGS. 2, 3, 4 and 5 illustrate four stages in the operation of part of the apparatus illustrated in FIG. 1, FIGS. 6 and 7 are diagrammatic representations illustrating the operation of one of the conveyors seen in FIGS. 2 to 5, FIG. 8 is a diagrammatic representation illustrating how layers of active material are built-up, FIG. 9 is a view similar to FIG. 1 illustrating a second embodiment of the present invention, FIG. 10 is a diagrammatic side elevational view of part of the apparatus of FIG. 9, and FIG. 11 is a flow diagram illustrating the operation of the apparatus of FIG. 9.

Referring first to FIGS. 1 to 8 of the accompanying drawings the manufacturing method and apparatus will be described in relation to the production of positive active material elements for use in a NiCad cell forming part of a NiCad battery, but is to be understood that substantially the same process, using substantially the same apparatus can be utilized to produce negative active material elements for use in NiCad cells, and both positive and negative active material elements for use in other forms of cell.

A hopper 11 receives positive active material from a mixer in a mixture comprising Nickel Hydroxide, finely divided Metallic Nickel, Graphite, PTFE, Isopropylalcohol (IPA) and water. The mixture, which is in the form of a crumb rather than a dough is maintained at a temperature in the range of 30–50 °C conveniently 40 °C, in the hopper 11, and passes from the hopper 11 between a first pair of steel rolls 12 which are heated to a similar temperature and which roll the mixture into a continuous strip 13, approximately 500 mm in width and typically 1.65 mm in thickness. The working of the active material mixture which takes place during passage of the mixture between the rolls 12 results in formation of fibres of PTFE which extend predominantly lengthwise of the strip 13.

The strip 13 issuing from the rolls 12 is deposited on the upper run of the continuous belt of a conveyor 14, the upper run travelling at the same speed as the strip 13 issues from the rolls 12. Thus the strip 13, which is soft and has very little inherent strength, is not subjected to stretching, or compression as it engages the conveyor 14.

The conveyor 14 delivers the strip to a cutter 15 which cuts the strip transversely to produce cut sheets substantially 500 mm in length.

Cut sheets 16 leaving the cutter 15 pass onto the upper run of the belt of a conveyor 17 aligned with the conveyor 14 and travelling at the same speed. The receiving end of the conveyor 17 is fixed adjacent the cutter 15, but the opposite end of the conveyor 17 is movable. FIGS. 6 and 7 illustrate the operation of the movable end of the conveyor. The belt 18 of the conveyor 17 passes, at the end of the conveyor 17 adjacent the cutter, around a large diameter driven roller 19. The position of the driven roller 19 is fixed. Following the direction of travel of the conveyor the belt passes around a first smaller diameter roller 21, the rollers 19 and 21 defining opposite ends of the upper run of the conveyor. After passing around the roller 21 the belt passes around a second small diameter roller 22 and then around a third small diameter roller 23 before returning to the roller 19. The roller 23 is fixed in position relative to the roller 19 and thus the rollers 19 and 23 define a lower run of fixed length "a" the position of which in relation to the cutter 15, is fixed. The rollers 21 and 22 form parts of a movable roller assembly and the spacing "b" between the axes of rotation of the rollers 21 and 22 is fixed. However, the movable roller assembly can be moved towards and away from the roller 19 thus decreasing or increasing the length of the upper run of the conveyor 17. FIG. 6 shows the upper run at substantially its maximum length and FIG. 7 shows the upper run at substantially its minimum length, the rollers 21 and 22 being at their extended and retracted positions respectively. It will be understood that movement of the rollers 21 and 22 relative to the rollers 19 and 23 does not affect the speed of rotation of the drive roller 19, and thus irrespective of movement of the rollers 21 and 22 the belt 18 is driven by the roller 19 at a constant rate identical to that of the conveyor 14.

The end of the conveyor 17 which is movable is the discharge end, but in a further example of the invention to be described later, there is a similar conveyor where the movable end is the receiving end. This type of conveyor will, for the purposes of the present application, be referred to as "a movable end conveyor". The movable roller assembly of such a conveyor is conveniently supported in linear guides on the frame of the conveyor and is movable in the direction of the conveyor, relative to the remaining rollers of the conveyor, by means of electric motor actuators or hydraulic or pneumatic rams. It would of course be possible to move the roller assembly in one direction against the action of a return spring so that movement in the opposite direction is provided by the return spring. However, in the various forms of apparatus disclosed herein it is preferred that the roller assemblies are moved by double-acting rams and so are positively driven both in the retracting, and in the extending direction.

Figure 2:
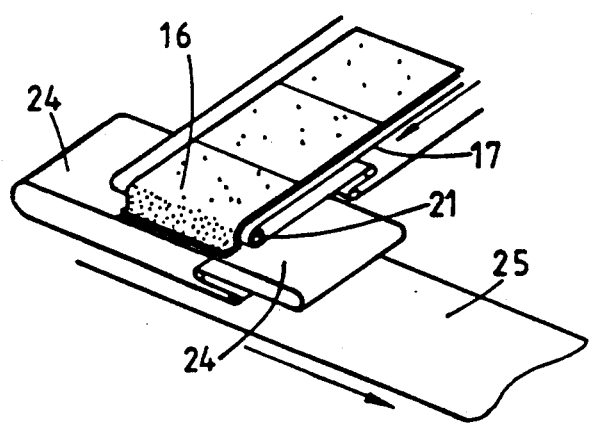
Figure 3:
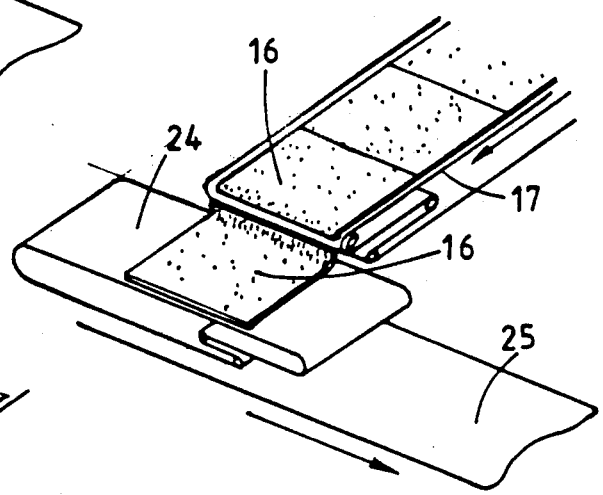
Figure 4:
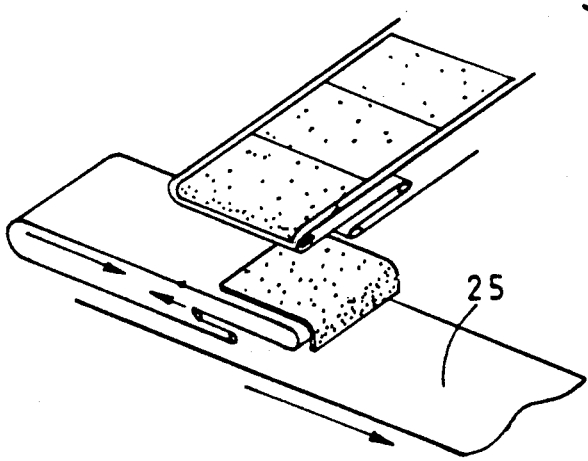
Figure 5:
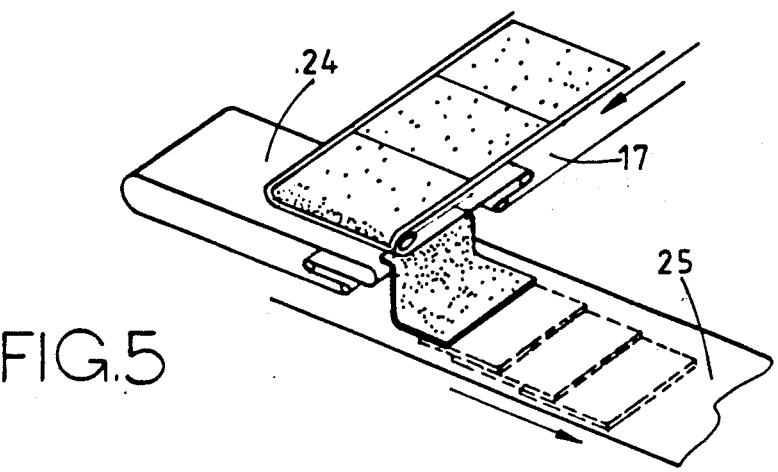

As is apparent from the drawing a second moving end conveyor 24 lies beneath the movable end of the conveyor 17, but is orientated at right angles to the conveyor 17. The "throw" of the movable end of the conveyor 17 is such that the roller 21 traverses the width the of the belt of the conveyor 24. FIGS. 2, 3, 4, and 5 illustrate the transfer of cut sheets 16 from the conveyor 17 to the conveyor 24 and from the conveyor 24 to a further conveyor 25. FIG. 2 shows that the end of the conveyor 17 is extended so that the top run of the conveyor 17 is at its maximum length and a cut sheet 16 is just passing over the roller 21 to be deposited on the conveyor 24. In order that the cut sheet 16 is not subjected to lateral shearing forces during delivery on to the top run of the conveyor 24 the conveyor 24 is, at this stage, stationary there being no drive to the belt of the conveyor 24. A sensor (not shown) which may conveniently be an optical sensor detects the edge of a cut sheet 16 passing over the roller 21 of the conveyor 17 and a signal derived from the sensor is applied to a control unit which effects movement of the rams of the roller assembly of the conveyor 17 to retract the roller assembly thus causing the roller 21 to move across the width of the upper run of the conveyor 24. The retracting motion of the discharge end of the conveyor 17 coupled with the continued forward motion of the belt of the conveyor 17 rapidly deposits the cut sheet 16 onto the upper run of the conveyor 24. Immediately the roller assembly of the conveyor 17 reaches its fully retracted position a sensor, sensitive to the position of the roller assembly, sends a signal to the control unit to initiate rapid movement of the belt of the conveyor 24. Thus the cut sheet 16 which was deposited on the conveyor 24 is now being moved, by the conveyor 24, at right angles to the path in which it moved previously on the conveyors 14 and 17. FIG. 3 illustrates this position.

The conveyor 24 is a moving end conveyor identical to the conveyor 17 and the roller assembly of the conveyor 24 is in its extended position when the cut sheet 16 is delivered onto the upper run of the conveyor. The point on the upper run at which the sheet 16 is delivered is quite close to the discharge end of the conveyor 24 and running beneath the conveyor 24, and parallel thereto is a conventional fixed length conveyor 25. The belt of the conveyor 25 moves at one fifth of the speed of the belts of the conveyors 14 and 17. As mentioned previously the cut sheet 16 is deposited on the conveyor 24 quite close to the discharge end of the conveyor 24 and a sensor, conveniently an optical sensor monitoring the discharge end of the conveyor 24, sends a signal to the control unit as the edge of the cut sheet 16 reaches the end of the conveyor 24 to initiate retraction of the roller assembly of the conveyor 24 so that the sheet 16 is rapidly deposited on the belt of the conveyor 25.

Thereafter the roller assembly of the conveyor 24 is immediately extended again and drive to the belt of the conveyor 24 is stopped. During the period of time while the cut sheet 16 is delivered onto the belt of the conveyor 25 and the roller assembly of the conveyor 24 is again extended, the roller assembly of the conveyor 17 is extended so that the roller 21 is again positioned adjacent the far edge of the belt of the conveyor 24 in readiness to deposit a second cut sheet on the conveyor 24. The cycle of operation is then repeated, but it will be recognised that since the belt of the conveyor 25 is moving at only one fifth of the speed of the conveyors 14 and 17 then the second cut sheet 16 will be deposited onto the conveyor 25 such that it overlies four fifths of the first cut sheet 16.

Figure 8:
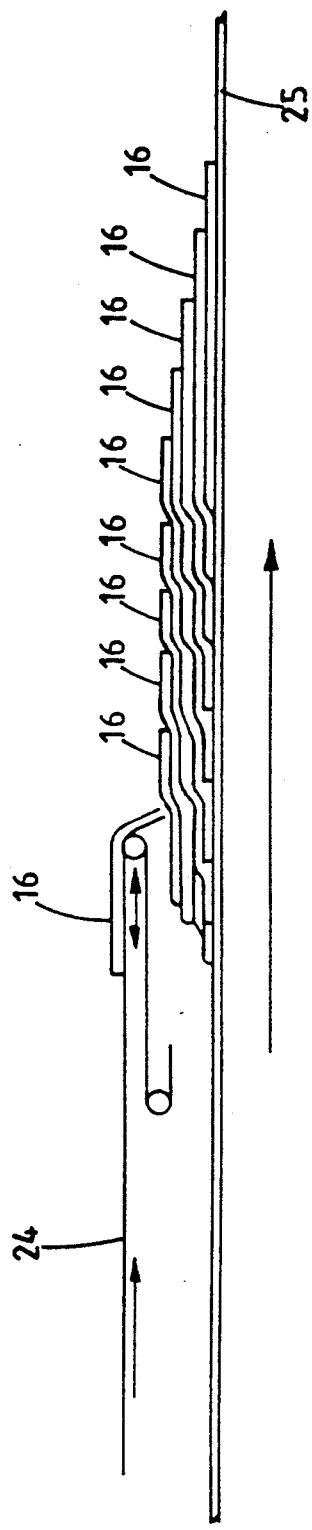

It follows therefore that during repeating cycles of the conveyors 17 and 24 there will be built-up a series of cut sheets 16 on the conveyor 25 of five sheet thickness (see FIG. 8). It is important to recognise that conveyor 24 operates rapidly to deliver cut sheets to the conveyor 25, and thus is not a limiting factor in the overall operation. Conveyor 24 can operate to deliver a cut sheet to the conveyor 25 in less time than is needed to deliver the next cut sheet to the conveyor 24. Thus the conveyor 24 waits for delivery of cut sheets thereto. Naturally the operation of the conveyor 24 controlled so as to be initiated at the same point in each machine cycle so as to deliver cut sheets evenly spaced to the conveyor 25. It will be understood that the belt speed of the conveyor 25 relative to that of conveyors 14, and 17 determines the number of sheets laminated together. Thus for a two, three or four sheet lamination the belt speed of the conveyor 25 would be, respectively, half, one third, or one quarter the belt speed of the conveyors 14 and 17. It is found that given careful control of the mixture constituents and the mixing process it may well be possible to achieve satisfactory results using only two or three sheet laminations.

It will be recognised that since the conveyor 17 delivers cut sheets 16 to the conveyor 24 with the conveyor 24 stationary then there is no tendency for the cut sheets to be sheared laterally during transfer. Moreover, because the conveyors 24 and 25 run at right angles to the conveyors 14 and 17 then the cut sheets built into a five layer thickness on the conveyor 25 have the PTFE fibres produced during the first rolling, extending transverse to the run direction of the conveyor 25. After the first five sheets have been delivered to the conveyor 20 then it will be recognised that the conveyor is in effect carrying a continuous strip of active material of five sheet thickness the material having its PTFE fibres extending at right angles to the conveyor 25.

As is apparent from FIG. 1 the five sheet thickness strip carried by the conveyor 25 is delivered to a second pair of steel rolls 26 which are also maintained at 30 to 50 °C, and which roll the five sheet thickness to a strip of single sheet thickness but of same width as the cut sheets. The speed of the rolls 26 is chosen to ensure that there is no backlog of material created at the pinch of the rolls and thus the single sheet thickness material issuing from the rolls 26 issues at a speed which is generally five times that of the conveyor 25 feeding the five sheet thickness to the rolls 26. The output from the rolls 26 is received by a conveyor 27 equivalent to the conveyor 14 and travelling at the same speed.

The continuous sheet of active material from the rolls 26, carried by the conveyor 27, is cut into sheets, 500 mm in length, by a rotary cutter 28 equivalent to the cutter 15 and the cut sheets are received by a moving end conveyor 29 equivalent to the conveyor 17 and operating in the same manner and at the same speed. The moving end conveyor 29 deposits cut sheets 30 singly onto a moving end conveyor 31 equivalent to the conveyor 24 the relationship between the conveyors 29 and 31 being the same as the relationship between the conveyors 17 and 24 described above. Thus at the point when a cut sheet 30 is delivered from the conveyor 29 to the conveyor 31 the conveyor 31 is stationary.

The conveyor 31 delivers individual cut sheets 30 to a conveyor 35 equivalent to the conveyor 25 the conveyor 35 running at one fifth of the speed of the conveyors 27, 29 and 31. As with the earlier conveyors, the conveyors 35 and 31 are parallel to one another, and at right angles to the conveyors 27 and 29. Thus in the strip of five layer thickness which is created by depositing individual cut sheets 30 on the conveyor 35, the PTFE fibres formed in the first rolling, between the rolls 12, are orientated lengthwise of the conveyor 35 whereas PTFE fibres formed in the second rolling, between the rolls 26, are transverse to the conveyor 35. At this point therefore the active material has been rolled in two mutually perpendicular directions so as to produce an interlocking arrangement of mutually perpendicular PTFE fibres.

British patent 1346890 discloses folding and re-rolling but this does not in any way suggest rolling of the material in two mutually perpendicular directions. Unless the material in 1346890 was folded diagonally or rotated relative to the rolls between rolling stages then fibre formation would remain in one direction. 1346890 is silent both with regard to diagonal folding and rotation of material and thus it must be considered that 1346890 does not disclose rolling in two mutually perpendicular directions to achieve interlocking fibres.

The five sheet thickness of twice rolled active material is carried by the conveyor 35 to a third pair of steel rolls 36 which roll the five layer thickness back to a single layer thickness, and as with the rolls 26, the rolls 36 are operated at 30–50 °C, and at a speed such that there is no backlog of material at the pinch of the rolls. Thus the single sheet thickness strip issuing from the rolls 36 issues at approximately five times the speed of the conveyor 35, and is received by a conveyor 37 which transports the strip to a final pair of steel rolls 38 which reduce the thickness of the strip to a predetermined final thickness. The active material strip issuing from the rolls 38 is received by a conveyor 39 travelling at an appropriate speed and which carries the strip of active material through a thickness gauge which continually monitors the thickness of the material issuing from the rolls 38, and transports the material from the thickness gauge through an oven where the strip is dried to a constant weight. Thereafter the strip passes to a cutter which cuts the active material into rectangles of the appropriate size to constitute active material elements for the electrodes of the secondary cell before being passed to an assembly station at which the active material elements are incorporated into secondary cell electrodes.

Although the operation of the conveyors 29, 31 and 35 and the sensors and control means associated therewith has not been described in detail it is to be understood that it is, in effect, a repeat of the disclosure in relation to the conveyors 17, 24, and 25 above.

It is believed that the method and apparatus disclosed above can operate satisfactory at speeds sufficient to process strip issuing from the rolls 12 at 5 meters per minute. However, if greater processing speed is required the apparatus described above may not be able to handle cut sheets reliably and thus the apparatus and process now to be described with reference to FIGS. 9, 10 and 11 is proposed.

Active material from a hopper equivalent to the hopper 11 of FIG. 1 is shaped to form a continuous strip approximately 500 mm wide and 1.65 mm thick by passing it between a first pair of rolls heated to 30–50 °C, equivalent to the rolls 12 of FIG. 1. The strip issuing from the rolls is received by the top run of the belt of a first movable end conveyor 41 there being a rotating cutter 42 part way along the top run of the conveyor 41 for cutting the continuous strip into sheets 500 mm long. The movable end of the conveyor 41 is the discharge end of the conveyor 41 and aligned therewith is a movable receiving end of a second movable end conveyor 43. The mechanisms of the movable end conveyors are not shown in FIG. 9. The movable roller assembly of the conveyor 41 is linked to the movable roller assembly of the conveyor 43 so that the movable ends of the conveyors always move in unison, the movable end of the conveyor 43 extending as the movable end of the conveyor 41 retracts and vice-versa. It must be recognised however, that while the extension and retraction of the conveyors 41 and 43 is always in unison, the belts of the two conveyors can be driven at different speeds.

As is illustrated diagrammatically in FIG. 10 the cutter 42 cuts against the belt of the conveyor 41, the belt being support by an anvil 42a beneath the rotating cutting 42. FIG. 10 also shows the roller 41a of the movable roller assembly of the conveyor 41 physically linked to the equivalent roller 43a of the movable roller assembly of the conveyor 43.

At its immovable end the conveyor 43 can discharge onto the movable, receiving end of a further movable end conveyor 44. The movable end of the conveyor 44 can traverse the width of a further movable end conveyor 45 disposed at right angles to the conveyors 41, 43, 44 and a conventional fixed length conveyor 46 runs beneath, and parallel to, the conveyor 45. In order to explain the operation as simply as possible it is convenient to assume that the spacing between the cutter 42 and the roller 41a of the conveyor 41, when the roller 41a is in its fully extended position, is 500 mm, that is to say the length of one cut sheet.

The apparatus operates continuously, but for the purposes of description we will assume a starting point at which the conveyor 41 is fully extended and the cutter 42 has operated to produce a cut sheet S. Since the conveyor 41 is extended the conveyor 43 must be fully retracted since the two are linked as mentioned above. At this stage the conveyor 44 will be fully extended and thus there is a substantially continuous conveyor surface from the conveyor 41 across the conveyor 43 and onto the conveyor 44. However, the conveyors are not necessarily operating at the same belt speed. The belt of the conveyor 41 is driven continuously at speed "V" and this belt speed is not changed during the cycle of operation.

The belt of conveyor 43 operates at a speed of either "V", or "2V" the actual speed being determined by the point in the cycle of operation. The belt of conveyor 44 operates in the speed range "Zero" to "2V" again dependent upon the point in the cycle of operation. The conveyor 46 runs continually at one fifth of "V" ("0.2V") and the operating speed of the conveyor 45 is either at least "2V" or "Zero" dependent upon the point in the cycle of operation.

The operational stages illustrated in FIG. 11 are identified by the Roman numerals (i) to (xiv) and these numerals appear below as a link to FIG. 11.

As mentioned above, starting from the point at which conveyor 41 is fully extended and the cutter 42 has just operated to cut the sheet from the incoming strip [(i)] the speed of the conveyor 41 will be "V", and the control mechanism of the apparatus will have reduced the speed of the conveyor 43, which is travelling in the same direction as the conveyor 41, from "2V" to "V" so as to match the speed of the conveyor 41. At the same time the speed of the conveyor 44 which is also travelling in the same direction as the conveyors 41 and 43, will have been reduced from "2V" to "Zero". The conveyor 45 will also be stationary but the conveyor 46 will be travelling at "0.2V". The control mechanism now causes the conveyor 41 to begin to retract [(ii)] and correspondingly the conveyor 43 is caused to extend. The leading edge of the cut sheet S which was aligned with the roller 41a now passes onto the conveyor 43 and thus transfer of the cut sheet S onto the conveyor 43 commences. At the point at which the cutter operated to sever the sheet S a previously cut sheet S" was present on the conveyor 44 with its trailing edge aligned with the roller 44a of the conveyor 44.

The belt of the conveyor 44 is, at this stage, stationary and as the conveyor 41 retracts with accompanying extension of the conveyor 43, to transfer the cut sheet S from the conveyor 41 to the conveyor 43, the conveyor 44 is caused to retract (without driving the belt thereof) so that the roller 44a of the conveyor 44 traverses the width of the conveyor 45 and thus deposits the previously cut sheet S' onto the stationary conveyor 45. The delivery of the previously cut sheet S' from the conveyor 44 to the conveyor 45 is completed while the delivery of the cut sheet S from the conveyor 41 to the conveyor 43 continues [(iii)]. Thus while the conveyor 41 continues to retract with accompanying extension of the conveyor 43 the retraction of the conveyor 44 to deliver the sheet S' to the conveyor 45 has been completed and the conveyor 44 starts to extend again [(iv)] and drive to the belt of the conveyor 44 is initiated to increase the speed of the belt from "Zero" to "V". Simultaneously the belt of the conveyor 45 is driven so that its speed increases from "Zero" to at least "2V". At the point at which the conveyor 41 is fully retracted [(v)] and the conveyor 43 is correspondingly fully extended the cut sheet S has been transferred completely onto the conveyor 43 and the speed of the belt of the conveyor 43 is now increased from "V" to "2V" the conveyor 44 is by now fully extended in readiness to receive the cut sheet S from the conveyor 43, and its belt speed is increased "V" to "2V" in readiness to receive the cut sheet from the conveyor 43. The conveyor 41 continues to operate at speed "V".

The conveyor 41 now starts to extend [(vi)] with corresponding retraction of the conveyor 43, but the speed of extension of the conveyor 41 is controlled so that the leading edge of the next sheet to be cut remains aligned with the roller 41a. Thus although control is effected by a sensor detecting the presence of the leading edge of the active material strip aligned with the roller 41a, the effect is that the conveyor 41 is extended, and the conveyor 43 is retracted, at speed "V", and since the conveyor 43 is operating at speed "2V" then an increasing gap occurs between the leading edge of the material on the conveyor 41 and the trailing edge of the cut sheet S. At this stage the speed of the conveyor 44 has reached "2V" and the leading edge of the cut sheet S is received by the movable, receiving end of the conveyor 44.

Extension of the conveyor 41 with retraction of the conveyor 43 continues accompanied by transfer of the sheet S to the conveyor 44. Simultaneously the conveyor 45, which is now operating at a speed of at least "2V" has its movable, discharge end retracted rapidly to deliver the sheet S' onto the parallel conveyor 46 [(vii)]. Before the conveyor 41 has fully extended again, and before the sheet S has been transferred fully onto the conveyor 44, the conveyor 45 will have retracted fully so delivering the sheet S' to the conveyor 46 and will have restored to its extended position [(viii)] with drive to the belt of the conveyor 45 having been discontinued so that the belt is now stationary.

As the conveyor 41 reaches its point of full extension [(ix)] the sheet S will have been transferred completed onto the conveyor 44 and a sensor will have detected the trailing edge of the sheet S moving into alignment with the roller 44a of the conveyor 44. Detection of the trailing edge of the sheet S in alignment with the roller 44a causes the control mechanism to reduce the speed of the conveyor 43 from "2V" to "V" and to reduce the speed of the conveyor 44 from "2V" to "Zero" the reduction in the speed of the conveyor 43 from "2V" to "V" matches the speed of the conveyor 43 with that of the conveyor 41 in readiness to receive the next cut sheet. At this point in time the next sheet will be cut since the rotary cutter 42 will have performed a complete revolution, and it will be recognised that the apparatus will have performed one complete cycle.

The second, and subsequent cycles [(x)–(xiv)] are simply repeats of the operating sequence described above, but it will be understood that since the conveyor 46 is moving at a speed of "0.2V" then by the time that the conveyor 45 delivers the sheet S onto the conveyor 46 the sheet S' will have been moved only through one fifth of its length and thus sheet S will be delivered onto conveyor 46 so as to overlap four fifths of sheet S' [(xiv)]. The next sheet will overlap four fifths of sheet S, and thus will overlie three fifths of sheet S' and repeated delivery of sheet to the conveyor 46 will thus build up a continuous strip of five sheet thickness.

The conveyor 46 delivers the laminated strip of five sheet thickness to a second pair of steel rolls 47 (FIG. 9) which roll the laminated strip back to single sheet thickness. Thus the single sheet thickness strip issuing from the rolls 47 issues, by virtue of the speed of operation of the rolls 47, at a speed five times that of the conveyor 46, and thus the strip issues at speed "V". The conveyor receiving the strip from the rolls 47 is the equivalent of the conveyor 41, and the apparatus described above is repeated downstream of the rolls 47 so as to turn the strip through a further 90 C, and relaminate the strip in five layer thickness before rolling again. The apparatus, and the process following the third rolling of the active material is exactly as described with reference to FIG. 1 in that the material passes through final sizing rolls, a thickness gauging station, a drying oven wherein the strip is dried to constant weight, and a cutting station wherein the dried strip is cut into elements of active material of predetermined size.

It will be understood that the apparatus described with reference to FIGS. 9, 10 and 11 fulfils functions similar to that described with reference to the preceding FIGURES in that active material is first rolled to produce fibres extending lengthwise of the strip, the cut strip is then turned through 90 C and passed to a second rolling stage so as to produce PTFE fibres at right angles to those produced during the first rolling stage, the material then being cut and again turned through 90 C before being submitted to a third rolling stage. Moreover, as described with reference to FIG. 1 the various rolls are preferably maintained in the range 30–50 CC as is the active material passing from the hopper to the first rolling stage.

The apparatus described with reference to FIGS. 9, 10 and 11 can operate at speeds significantly higher than those of the apparatus of FIGS. 1 to 8 by virtue of the spacing of sheets from one another generated by the operation of the conveyors 43 and 44 at a speed twice that of the conveyor 41. As with the conveyors described with reference to FIGS. 1 to 8 the mechanical construction of the conveyors is not critical, but desirably the movable roller assemblies of the movable end conveyors are moved either by electric motor actuators, hydraulically, or pneumatically on linear guides forming parts of the conveyor support structure. Control over conveyor extension and retraction, and conveyor speed will be preferably achieved electronically and in accordance with signals received from sensors detecting leading and trailing edges of active material strip and sheet as appropriate.

We claim:

1. A method of manufacturing elements of active material for use in the construction of electrodes for secondary electro-chemical cells comprising the steps of:
   rolling active material mixture between first roll means in a first direction to produce elongate strip,
   cutting the strip to define cut sheets of rolled material,
   transporting a cut sheet in said first direction on a movable end, first, conveyor,
   moving the movable end of said first conveyor to transfer said cut sheet to a stationary, second conveyor extending substantially perpendicular to said first conveyor,
   operating said second conveyor to transfer said cut sheet in a second direction substantially perpendicular to said first direction to a laminating station wherein the cut sheet is laminated with other cut sheets, and,
   rolling the laminated cut sheets between second roll means in said second direction.

2. A method as claimed in claim 1 wherein said active material mixture supplied to the first rolling step has a crumb consistency.

3. A method as claimed in claim 1 wherein the roll means utilized in each rolling step are maintained at a temperature above ambient.

4. A method as claimed in claim 2 wherein the roll means utilized in each rolling step are maintained at a temperature above ambient.

5. A method as claimed in claim 3 wherein said rolls are maintained at a temperature in the range 30°–50° C.

6. A method as claimed in claim 4 wherein said rolls are maintained at a temperature in the range 30°–50° C.

7. An apparatus for use in the manufacture of elements of active material for use in the construction of electrodes for secondary electro-chemical cells, the apparatus comprising:
   first roll means for rolling active material mixture in a first direction to produce elongate strip,
   a cutter for cutting said strip to define cut sheets of rolled material,
   a movable end, first, conveyor for transferring cut sheets away from said cutter in said first direction,
   a second conveyor extending substantially perpendicular to said first conveyor,
   means for moving the movable end of said first conveyor so as to transfer a cut sheet from the first conveyor to said second conveyor,
   control means rendering said second conveyor stationary during transfer thereto of a cut sheet,
   laminating means receiving cut sheets from said second conveyor and,
   second roll means for rolling laminated cut sheets in a second direction substantially perpendicular to said first direction.

* * * * *